United States Patent [19]
Dalier, Jr.

[11] Patent Number: 6,094,854
[45] Date of Patent: Aug. 1, 2000

[54] FISHING LURE WITH SPRING-LOADED ROTATABLE AND TRANSLATABLE HOOKS

[76] Inventor: Paul H. Dalier, Jr., 1647 Parkwood Dr., Laurel, Miss. 39440

[21] Appl. No.: 09/225,750

[22] Filed: Jan. 5, 1999

Related U.S. Application Data

[60] Provisional application No. 60/072,071, Jan. 21, 1998.
[51] Int. Cl.[7] .......................... A01K 85/12; A01K 85/00
[52] U.S. Cl. ........................................ 43/42.02; 43/42.04
[58] Field of Search ............................... 43/42.02, 42.04, 43/15, 42.19, 42

[56] References Cited

U.S. PATENT DOCUMENTS

| | | | |
|---|---|---|---|
| 2,799,109 | 7/1957 | Remington . | |
| 3,965,606 | 6/1976 | Bingler | 43/42.16 |
| 5,035,075 | 7/1991 | Pearce | 43/26.2 |
| 5,832,654 | 11/1998 | McQueeny | 43/42.04 |

Primary Examiner—Jack W. Lavinder

[57] ABSTRACT

A fishing lure comprises a body including a first portion and a second portion relatively movable to the first portion; and the second portion is movable in a direction opposite to the direction of the first portion. The fishing lure body may include a longitudinal axis; and the second portion may be rotatable about the longitudinal axis relative to the first portion. A hook may be provided on the second portion of body. A groove may be provided for guiding the movement of the second portion longitudinal and or transversely relative to the first portion.

22 Claims, 9 Drawing Sheets

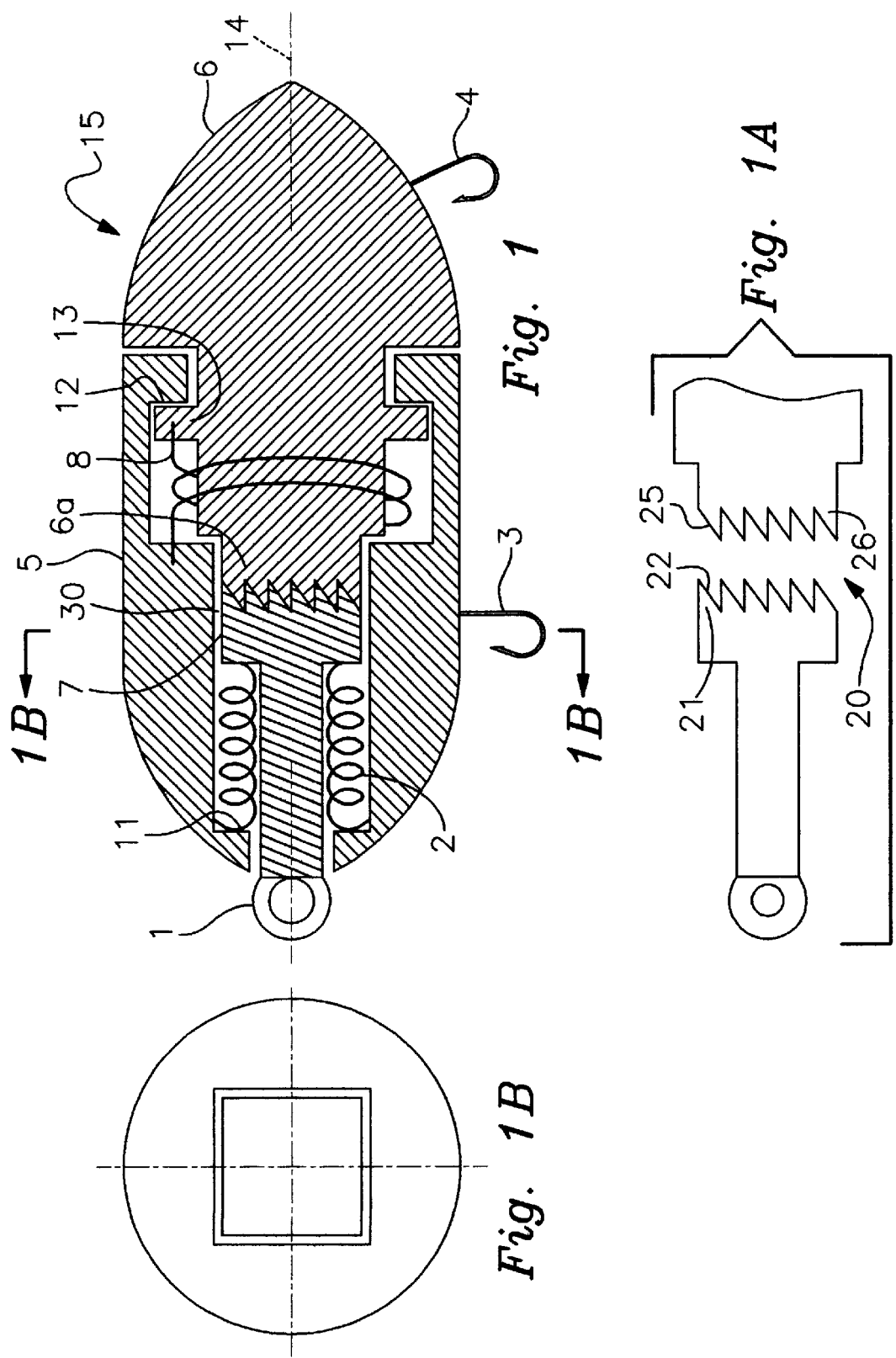

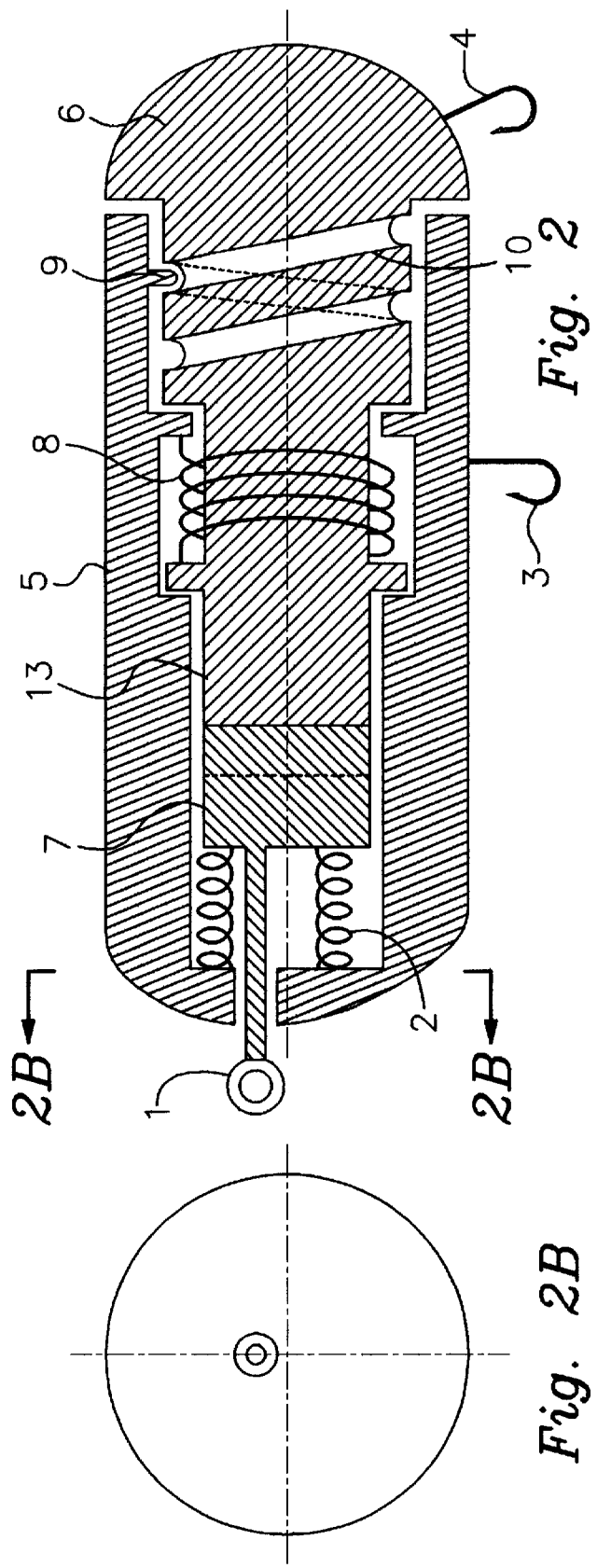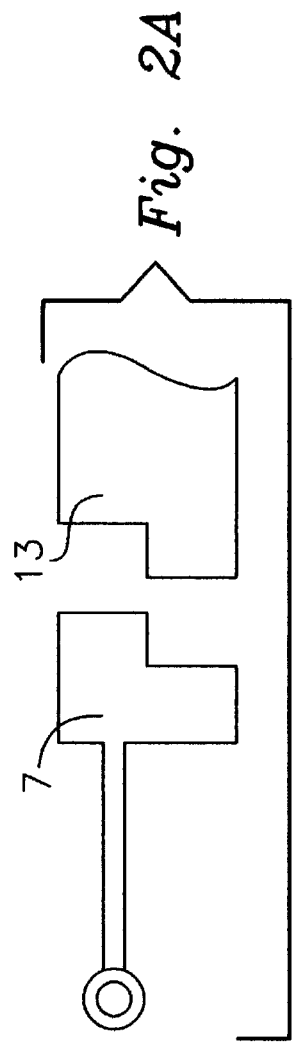

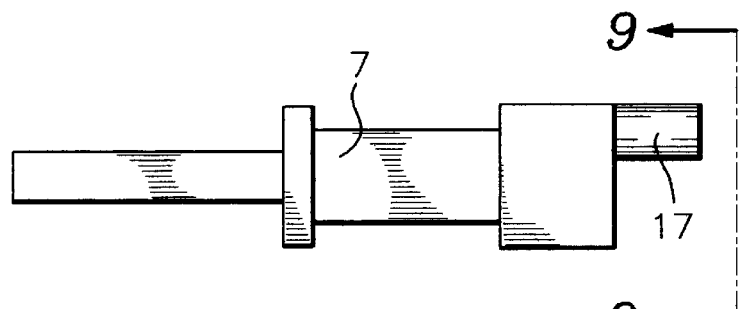
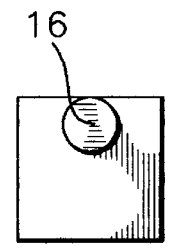
Fig. 8    Fig. 9
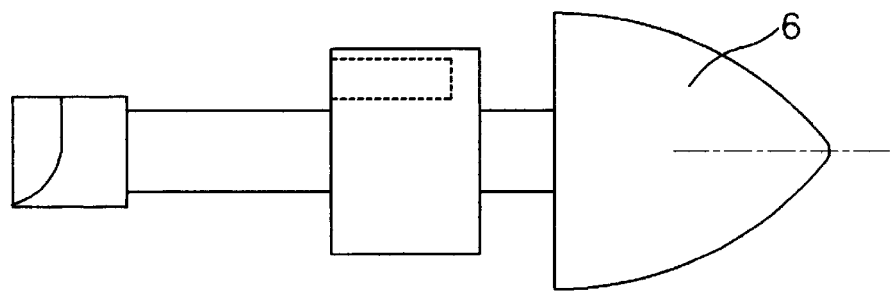
Fig. 10

FISHING LURE WITH SPRING-LOADED ROTATABLE AND TRANSLATABLE HOOKS

PRIORITY APPLICATION

Priority is claimed pursuant to Provisional Patent Application Ser. No. 60/072,071; Filing Date: Jan. 21, 1998 by Paul H. Dalier, Jr. entitled: Fishing Lure With Spring-Loaded Rotatable And Translatable Hooks.

BACKGROUND OF INVENTION

1. Field of Invention

This invention relates to fishing lures. More particularly, this invention relates to fishing lures with hooks which are automatically set. Most particularly, this invention relates to hooks which are automatically set when a fish strikes the fishing lure and which hooks may be spring-loaded for movement in a rotatable direction when the hooks are set and/or which hooks are movable in a translatable direction relative to the body of the fishing lure when the hooks are set.

2. Prior Art

Fishing lures are known that have hooks which may be moved in accordance with the action of springs.

However, of known fishing hooks, none are set in a manner which ensures that the hook is set without intervention of the angler/fisherman. In addition, triggered hooks are not known in the art. Still further, such conventional fishing lures which operate with springs are typically complicated to operate and/or difficult to use.

Examples of known fishing lures include U.S. Pat. No. 3,492,753 to Richard; U.S. Pat. No. 5,440,830 to Smith; U.S. Pat. No. 3,081,572 to Tomsello; U.S. Pat. No. 2,439,391 to Jobson; U.S. Pat. No. 1,639,766 to Fisher; U.S. Pat. No. 2,641,861 to Doran; U.S. Pat. No. 2,576,532 to Nudell; U.S. Pat. No. 2,079,335 to Pflueger; U.S. Pat. No. 1,694,195 to Watts; U.S. Pat. No. 2,002,135 to Barton; U.S. Pat. No. 2,357,472 to Jenkins; and U.S. Pat. No. 2,794,287 to Mancusi, Jr.

Most of the cited prior art discusses the use of springs in lures. In Fisher, '766, the spring withdraws hooks. It does not set or rotate hooks. Jenkins, '472 has a spring which doesn't set hooks, but does move a segment back and forth to change direction as lure moves through water The Pflueger patent '335 has a body rotated by propeller. The spring holds this together and allows the lure to be disassembled to remove weeds.

In Watts, '195, the spring doesn't set the hook, it turns a vane or propellar as lure is jerked to change the direction. In Barton, 135 the springs allow a battery to float back and forth to allow power sequentially to a light. It also serves to secure the light within a sleeve of the lure.

Jobson, 391 uses a spring to retract the hook into the lure. Pulling the cam pushes the hooks out but doesn't twist. The springs (spring 1) moves cam back and (spring 2) moves set of hooks back into lure.

Doran, '861 is the most complicated. The spring moves a plunger which moves the hook out. Hooks are hidden in lure. A locking device activates this. The locking device must be hit by fish, not by tension on the line. The movement of the lure does not activate it and it does not twist one part relative to the other. The hooks spring out, but not radially around the axis, but instead spring perpendicular to the axis. The spring does activate the hook, but there must still be some action to set the hook. The same can be said about Tomsello, '572 where the spring moves the hook out of the body. The action doesn't make hooking, it is just weedless so that it may be set. There is no readily changeable hook and no special hook setting features.

Nudell, '532 has a spring which retracts hooks into the lure and doesn't move the hooks to set the hook. This is also true of Smith, '830—where a spring moves hooks back into body of lure and Richard '753 where the spring pushes the hook back into lure. Mancusi, '287 also uses a spring which doesn't move a hook. The spring moves a piston to lengthen the body causing it to turn while it is pulled.

The prior art serves many useful functions, including providing lures which are less likely to snag and move through the water to attract fish. However, the prior art does not effectively use the turning of lure relative to the striking fish's pull on the line to set the hooks.

3. General Discussion of the Invention

The invention can be generally described as fishing lure for receiving hooks comprising:

1. A first section;
2. A second section;
3. A rotating means between the first section and second section for moving the first section relative to the section;
4. A first gripping means (such as a hook) on the first section;
5. A second gripping means (such as a hook) on the second section so that the twisting of the first section relative to the second section results in the movement of the two gripping means against one another.

The invention may further be described as including a trigger means for releasably holding and releasing the action of the rotating means.

The invention is further described wherein the rotating means further comprises a rotating means for turning one section relative to the axis of the second section (make sure to provide a basis for axis in the first claim) and wherein the rotating means is powered by a spring. When the first means is rotated relative to the second section a load is put on the rotating means. There may be an alignment means to indicate to the user when the first section is aligned with second section to power the rotating means. A spring may put tension on both a front portion with a hook and a rear portion with a hook relative to one another when the spring is released.

Typically, the trigger is on the heavier side so that the lighter side does not have sufficient momentum to trigger the release of the rotating means.

The lure rotating means further comprises a locking means for releasably locking the rotating means when tension is applied to the rotating means and, in particular, locking the rotating means until a fish hits the lure and then releasing the rotating means. A trigger mechanism is present for releasing the energy in the rotating means. Tension on the line releases the trigger which in turn releases the energy in the rotating means in the preferred embodiments.

OBJECTS OF THE INVENTION

It is therefore an object of the invention to provide for a fishing lure with an automatically set hook which overcomes the drawbacks of prior art fishing lures.

It is an object of the invention to provide a fishing lure which overcomes the drawbacks of prior art fishing lures.

It is a further object of the invention to provide a fishing lure having automatically set hooks that overcomes the drawbacks of conventional lures with hooks.

It is another object of the invention to provide a fishing lure having automatically set hooks which can be provided with a body and with hooks that rotate and/or translate relative to the body when being set.

It is a yet still further object of the invention to provide a fishing lure which has hooks that are spring-loaded and which may rotate and/or translate relative to the body of such lure.

It is another object of the invention to provide a fishing lure having spring-loaded hooks that is easier to use than conventional spring-loaded hook fishing lures.

It is another object of the invention to provide a fishing lure having spring-loaded hooks that operates more consistently than conventional spring-loaded hook lures.

It is another object of the invention to provide a fishing lure which automatically sets its fish hook without the need for any action by the angler after the fishing hook has been placed in a body of water for attracting fish.

It is a yet still further object of the invention to provide a fishing lure having an automatically set hook and/or hooks that sets itself in the mouth of the fish without the need to move the fishing lure in a direction out of the fish's mouth as in conventional self-setting fishing lures.

It is a further object of the invention to provide a fishing lure which is more environmentally friendly than prior art fishing lures owing to its enhanced accuracy and enhanced success rate, whereby the number of fish with injured mouths, for example, as frequently result from the use of conventional lures, is reduced; in that manner, the same number of fish can be caught while reducing the number of fatally-injured un-caught fish being left in the environment to become sick and/or die.

It is a further object of the invention to provide a fishing lure having an automatic hook setting mechanism which may be used with one or more hooks.

It is to be understood that the term "hook" includes one or more hooks, relative terms such as "left" and "right", and "up" and "down" are not intended to be limiting. In addition, the term "fish" is intended to include all hunted animals such as eels, frogs, and the like.

BRIEF DESCRIPTION OF DRAWING

FIG. 1 illustrates a cross section preferred embodiment of a fishing lure according to my invention;

FIG. 1a is a detailed view items 7 and 6a in FIG. 1.

FIG. 1b is a cross sectional view through 1B—1B FIG. 1.

FIG. 1a illustrates a trigger mechanism for the lure.

FIG. 2 includes another preferred embodiment of a fishing lure according to my invention;

FIG. 2a is a detailed view of items 7 and 13 in FIG. 2.

FIG. 2b is a cross sectional view of FIG. 2 through the 2B—2B axis.

FIG. 8 shows the plunger for FIG. 7.

FIG. 9 shows a sectional view of the plunger for FIG. 7.

FIG. 10 shows the rotating shaft for FIG. 7.

DETAILED DESCRIPTION OF THE PREFERRED EXEMPLARY EMBODIMENTS

Figures 3, 3A:
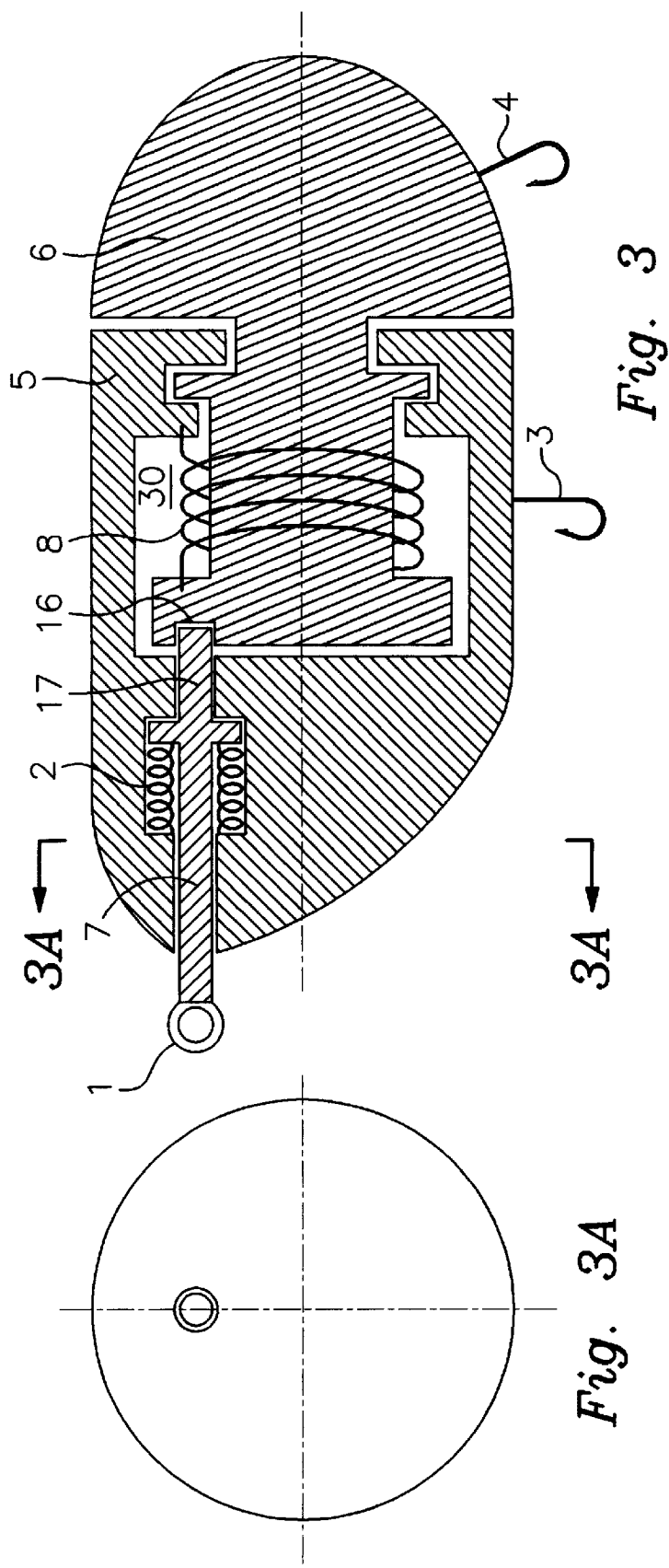
FIG. 3 includes another preferred embodiment of a fishing lure according to my invention.
FIG. 3a is a cross sectional view of FIG. 3 through the 3A—3A axis.

FIGS. 1 through 7 each illustrate separate preferred embodiments of self-setting fishing lure.

The description of each preferred embodiment for each figure, for convenience, utilizes similar reference numbers for identical parts. For purposes of reference, the attachment 1 on the lure for connecting the lure to a line or leader (not shown) is referred to as the front of the lure.

As can be see by reference to FIG. 1, for example, the fishing lure body will typically includes a trigger mechanism comprising, in FIG. 1, a plunger 7 within a chamber 30. This plunger 7 has plunger teeth 21 on the rear end of the plunger 7, opposite the attachment 1. The chamber 30 is formed by the first body portion 5 and defines a plunger spring retaining wall 11. This wall 11 receives the front end of at least one compression spring 2. The rear end of spring 2 pushes against plunger 7 so that the teeth 21 of plunger 7 are engaged with piston teeth 26. In this embodiment, the teeth 21 have a slanting face 22 and a straight face 23. Teeth 26 have oppositely facing slanting face 25 and oppositely facing straight faces 24.

The trigger mechanism is shown in the detail in FIG. 1a in a disengaged mode.

The first body portion 5 also defines a piston retaining wall 12. A piston 13 is an expanded front portion of a second portion 6. Since the piston 13 is loosely held withing the chamber defined by the first body portion 5, the piston 13 may rotate within the rear area of the chamber 30 just as the plunger 7 may move laterally from the front to the rear of the front area of chamber 30 against the tension of the compression spring 2.

A rotatable spring 8 is affixed on one end to the first body portion 5 and on the other end to the piston 13. In this way, when the first body portion is rotated relative to the piston 13, tension is applied to the spring. Since the spring 8 is the only mechanism joining permanently the first body portion to the second body portion 6, the second body portion may be twisted along the lure axis 14 while holding the first body portion 5 relatively still so that the twisting spring 8 is tensioned and so that slanting face 22 slides against oppositely facing slanting face 25 of opposing teeth 21 and 26. Since the piston teeth 26 are pushed in contact with plunger teeth 21 by action of spring 2, once tensioned so that slanting faces 22 have slid over oppositely facing slanting faces 25, the straight face 23 contacts and is held against oppositely facing straight face 26 with tension on the rotating spring 8.

Front hooks 3 may be placed on the first portion outer surface and rear hooks 4 may be in place on the outer surface of the second body portion 6. When the lure 15 is affixed on a fishing line by way of the attachment 1, here shown as a hole in the front of the plunger 7, and the spring 8 is tensioned by the twisting action referred to above, the lure is ready to cast. If a fish strikes the lure, tension is placed on the fishing line which pulls the plunger 7 out of fixed contact with the piston 13. As shown in FIG. 1a, this may actually cause a space 20 to form between the plunger teeth 21 and the piston teeth 16. Since spring 8 is tensioned, the two portions of the lure 5 and 6 spin relative to one another and hooks 3 and 4 spin in opposite directions setting one or both of the hooks. When both are set, the tension on the spring 8 prevents the loosening of the hooks by action of the fish.

The body defines a longitudinal axis 14 extending from left to right as viewed in FIG. 1. A hook 4, for example, may be provided on the second portion of the lure body. Tolerances between plunger 7 and the rear end 6a of the second portion 6 and the walls within chamber 30 defined by the first body portion 5, guide movement of second body portion 6 relative to first body portion 5. The grooves may extend transversely, and even perpendicularly relative to the longitudinal axis of the lure body.

The embodiment shown in FIG. 2 shows the use of a screw slot or female groove 10. A boss or protrusion 9 is configured for engaging female groove 10 and for being guided thereby when the second body portion rotates relative to first body portion 5. A spring 8 may be provided for keeping the second body portion normally engaged with first body portion 5. An attachment 1 may be provided for attaching a fishing line thereto.

In this embodiment, the trigger mechanism comprising a single plunger tooth and piston tooth without slanting walls 22 and 25 respectively. In order to set this mechanism, the piston and plunger are forcibly disengaged during the twisting operation, but otherwise function in the same manner.

The trigger mechanism shown in FIG. 3 removes tooth from the plunger and piston completely. In this embodiment, the piston defines an opening 16 in the front end. This opening 16 may be aligned with the rear end 17 of the plunger by twisting the first body portion 5 relative to the second body portion 6. When the opening 16 is aligned with the rear end 17 of the plunger the spring 2 pushes the rear end 17 moves into the opening 16 and holds the position of the plunger in place relative to the piston against the pressure of the spring 8 until the rear end 17 is removed from the opening 16 and the two portions may twist relative to one another.

The invention can be generally described as fishing lure for receiving hooks comprising:

2. A first section;
3. A second section;
4. A rotating means between the first section and second section for moving the first section relative to the section;
5. A first gripping means (such as a hook) on the first section;
6. A second gripping means (such as a hook) on the second section so that the twisting of the first section relative to the second section results in the movement of the two gripping means against one another.

The invention may further be described as including a trigger means for releasably holding and releasing the action of the rotating means.

The invention is further described wherein the rotating means further comprises a rotating means for turning one section relative to the axis of the second section and wherein the rotating means is powered by a spring. When the first means is rotated relative to the second section a load is put on the rotating means. There may be an alignment means to indicate to the user when the first section is aligned with second section to power the rotating means. A spring may put tension on both a front portion with a hook and a rear portion with a hook relative to one another when the spring is released.

Typically, the trigger is on the heavier side so that the lighter side does not have sufficient momentum to trigger the release of the rotating means.

The lure rotating means further comprises a locking means for releasably locking the rotating means when tension is applied to the rotating means and, in particular, locking the rotating means until a fish hits the lure and then releasing the rotating means. A trigger mechanism is present for releasing the energy in the rotating means. Tension on the line releases the trigger which in turn releases the energy in the rotating means in the preferred embodiments.

Figure 4:
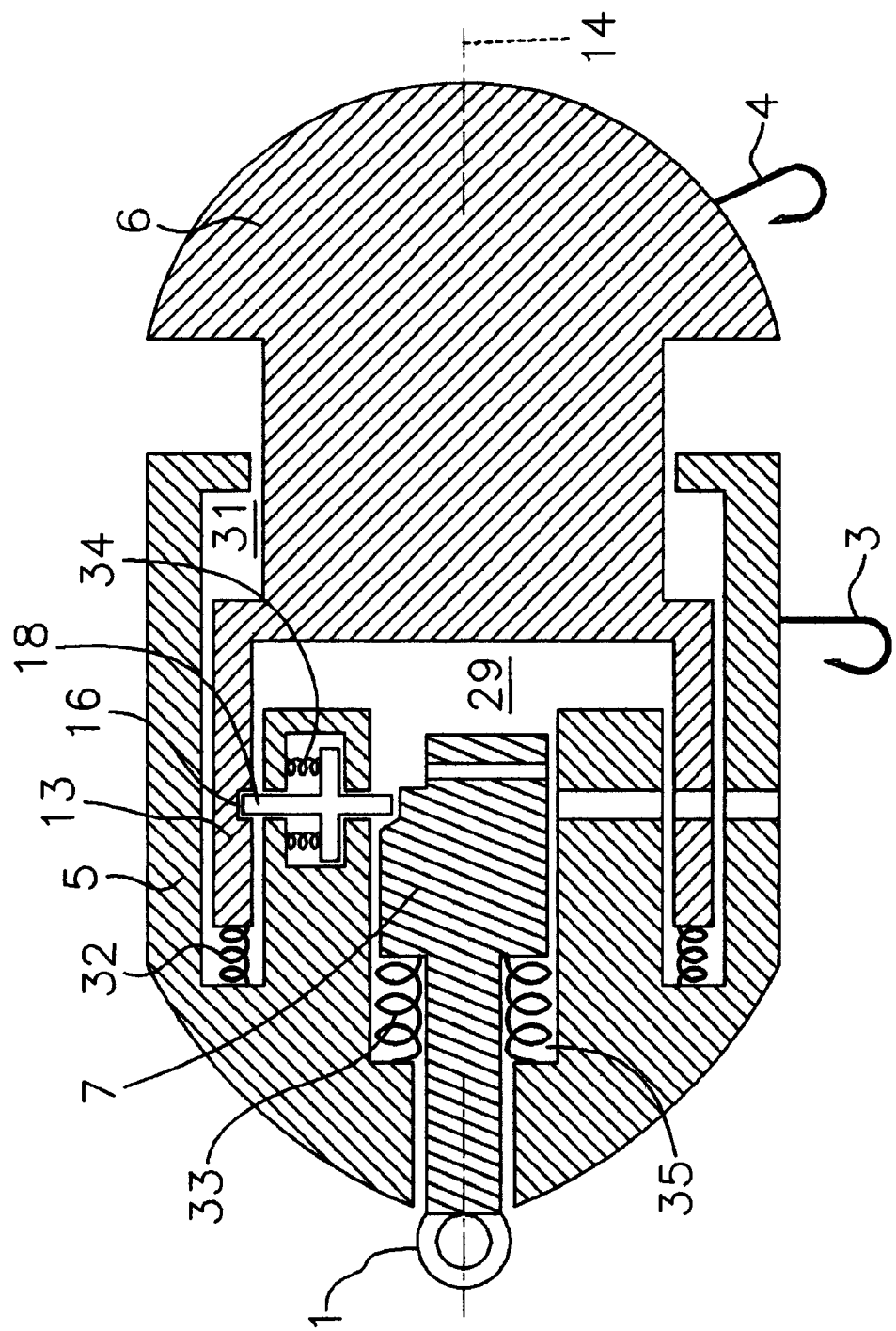
FIG. 4 includes another preferred embodiment of a fishing lure according to my invention.

FIG. 4 shows another alternative embodiment of the invention shown in FIG. 3 showing the trigger mechanism wherein the piston is separate from retaining pin 18 and wherein the rear end 17 of the piston serves as a retaining means for holding the retaining pin 18 within the opening 16 in the piston. Instead of relying on a twisting action, this embodiment uses the relative movement from front to rear of the first portion 5 relative to the second portion 6, eliminating a twisting spring.

In order to accomplish this result, there are three sets of compression springs 32, 22 and 34. The invention is cocked by pushing the second portion 6 and first portion 5 together, thereby driving the piston 13 against first compression spring 32 within a first chamber 31 defined by the first portion 5. At the same time, the plunger is pushed against the action of the second compression springs within the second chamber 29 which is continuous, in this case, with the first chamber 31, towards the rear so that the plunger platform 36 pushes the retaining pin 18 outward from the axis against the action of the third compressing springs 34 and into the opening 16 in the piston 13.

In this way, when the lure is hit, and the lure moves backward, the plunger 7 is removed, the plunger platform 36 is pulled out from under the retaining pin 18. The third springs 34 then push the retaining pin 18 out of the opening 16 in the piston 13. The springs 32 can then push the rear portion 6 away from the front portion 5 and the action of the front hook 3 relative to the rear hooks 4 sets the hooks and holds them in place.

Figure 5:
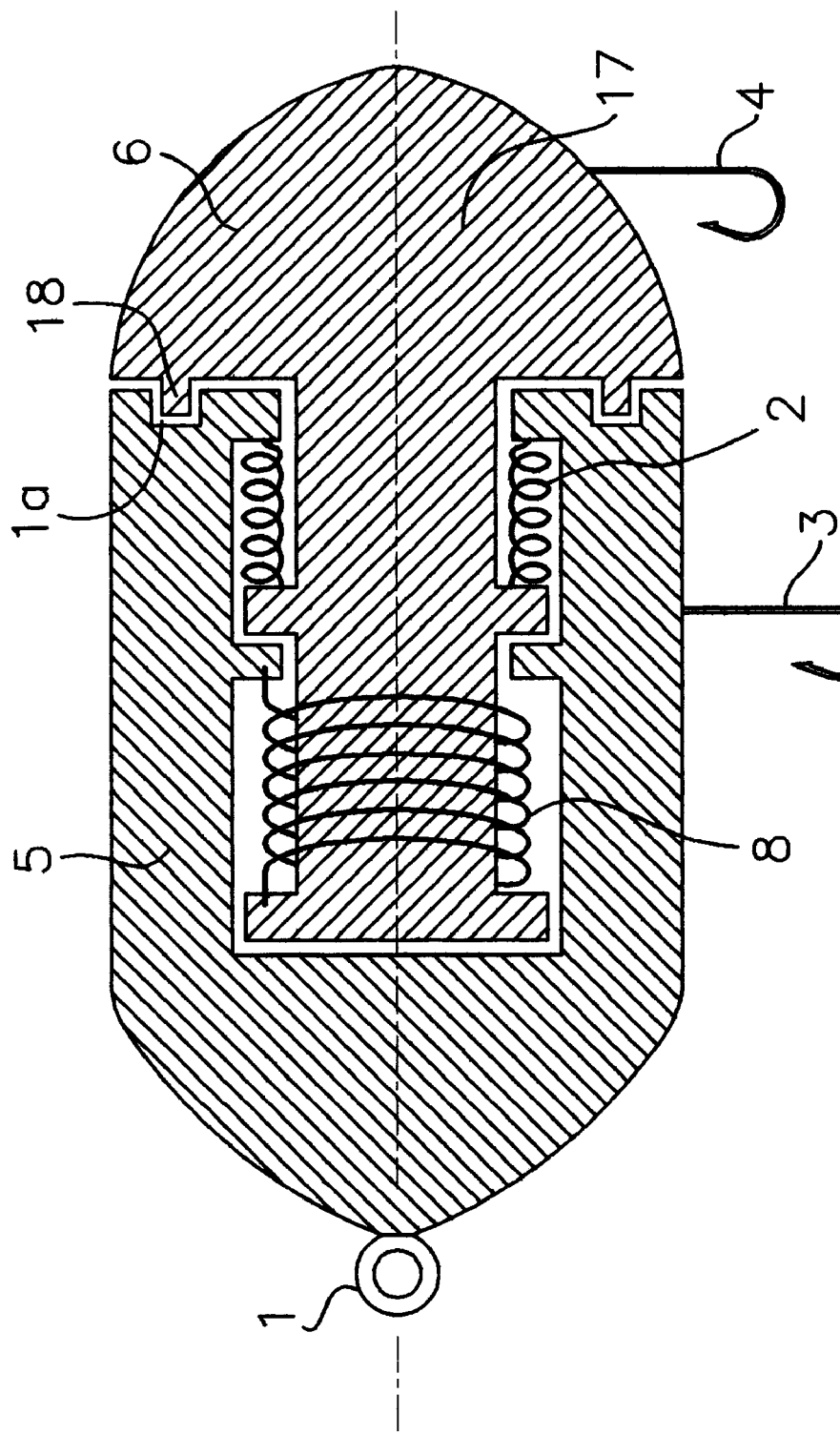
FIG. 5 includes another preferred embodiment of a fishing lure according to my invention.

FIG. 5 shows yet another embodiment wherein the plunger 7 is eliminated. In this embodiment, there is a rotating spring 8. When the invention is cocked, by rotating against the action of this spring 8, a retaining pin 18 attached to the second portion 6 is aligned with and fits within an opening 19 in the first portion 5. The pin 18 is kept in place by pressure exerted by compression springs 2 connected to the piston 17 on one end and the first portion 6 on the other end. When the fish hits the lure, the pin 18 is dislodged and the two hooks 3 and 4 are launched in opposite directions by the rotating spring 8, thereby setting and maintaining pressure on the opposing hooks 3 and 4.

Figure 6:
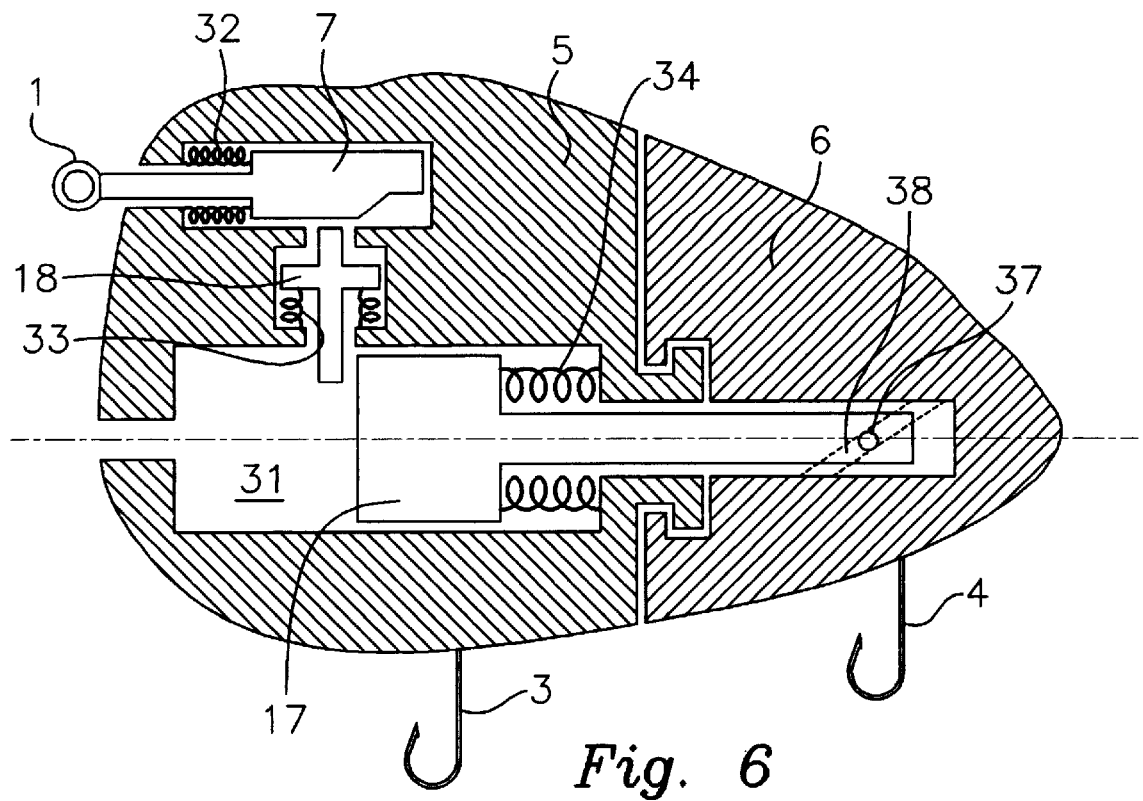
FIG. 6 includes another preferred embodiment of a fishing lure according to my invention.
Figure 6A:
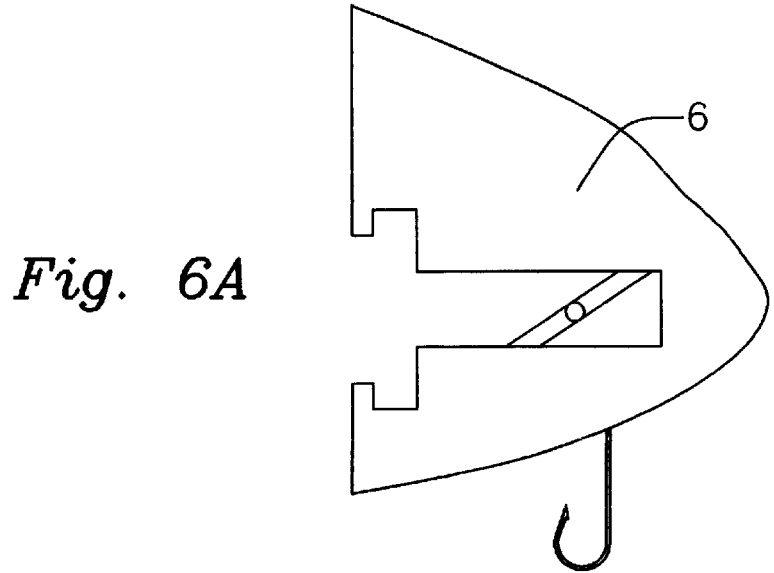
FIG. 6a is a detailed view of items 6 and 37 in FIG. 6.

FIG. 6 shows yet another embodiment. In this embodiment, the retaining pin 18 fits in front of the piston 17. The plunger is pushed in place holding the retaining pin 18 in front of the piston 17 and keeping it from moving into the first chamber 31 because springs 32 push the piston 17 in place against the retaining pin 18. When the line is pulled when a fish hits the lure, the springs 32 are compressed and the plunger 7 is moved allowing the retaining pin 18 to be pushed by second springs 33 so that it no longer blocks the piston 17. Third springs 34 then move the piston within the chamber 31. As the piston moves, a boss 37 moves within a spiral chamber 38 causing the rear portion 6 to rotate thereby rotating the front hook 3 relative to the rear hook 4.

Figure 7:
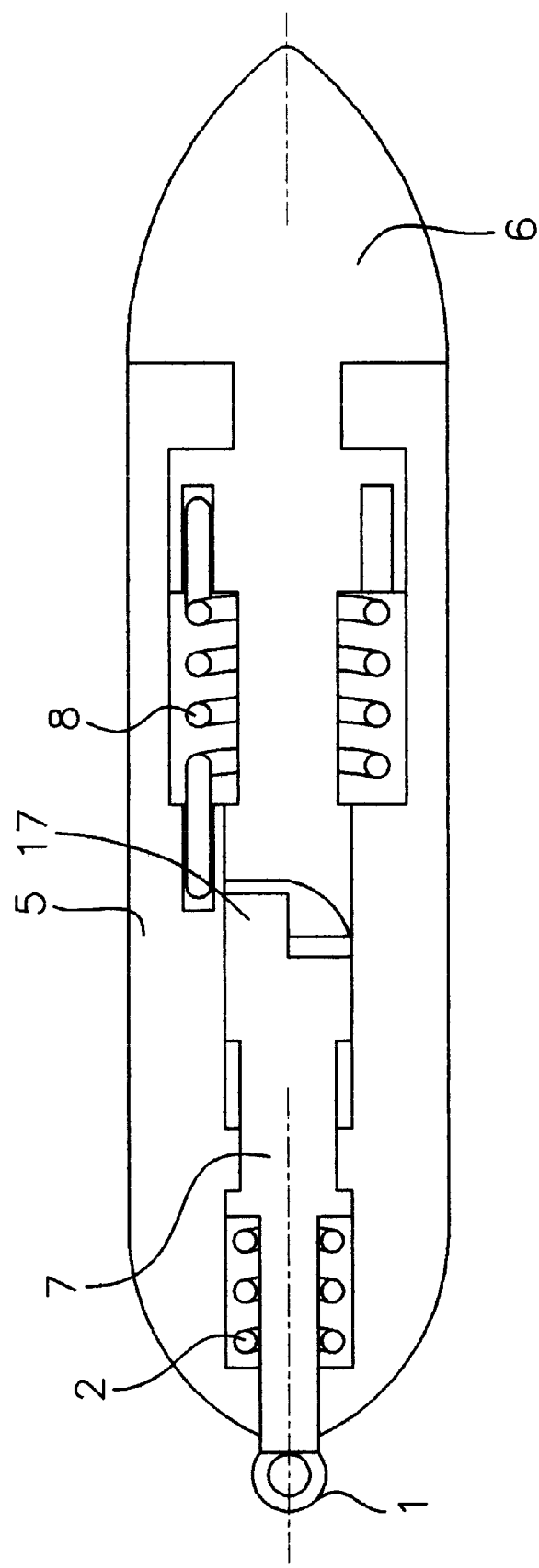
FIG. 7 includes another preferred embodiment of a fishing lure according to my invention.
Figure 11:
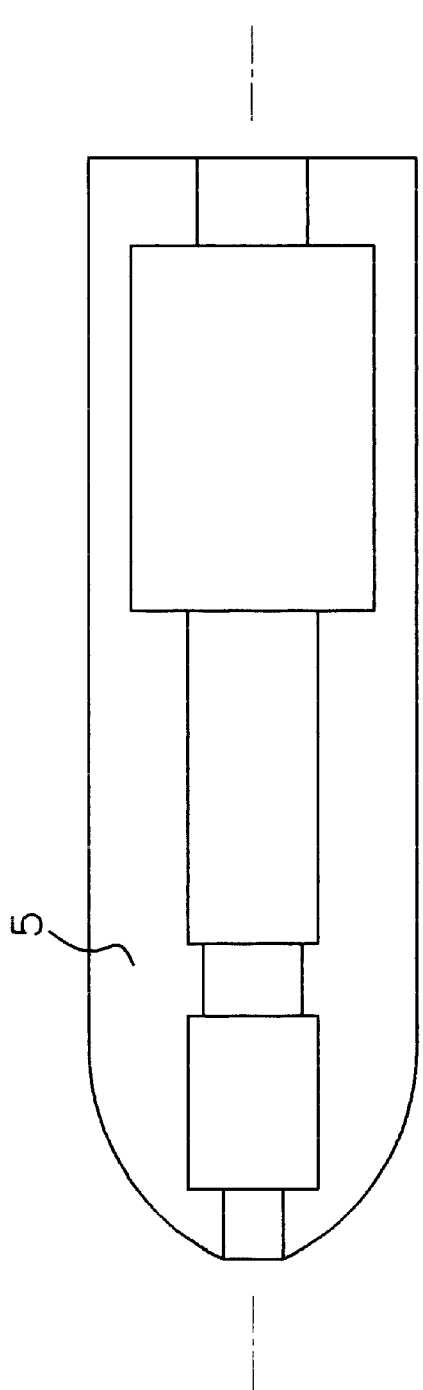
FIG. 11 shows the square section for FIG. 7.
Figure 12:
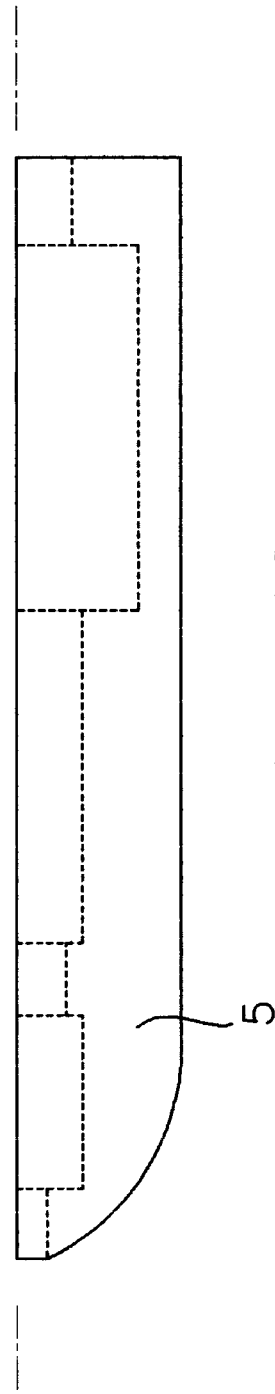
FIG. 12 shows the section of FIG. 11.

FIG. 7 shows an alternate layout for the embodiment shown in FIG. 3. It functions in a manner identical to that described in FIG. 3. FIGS. 8 and 9 show, respectively, a detailed view of the plunger 7 and piston opening 16. FIG. 10 shows a detail of the second body portion 6 including the piston 17 which is a part thereof.

It will appreciated that the description of the preferred embodiments is not intended to be limiting, and it is contemplated that the fishing lure may be made of any variety of materials, with any variety of springs and grooves for causing rotation and translation, and the like, as come within the scope of the invention.

While this invention has been described as having a preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention of the limits of the appended claims.

What is claimed is:

1. A fishing lure attached to a line having an axis, said lure for receiving hooks comprising:
   (a) a first section:
   (b) a second section;
   (c) a rotating means attached between the first section and second section for receiving and storing energy before the lure is cast and releasing the energy to rotate the first section relative to the second section upon the application of tension to the line and wherein the first section and second section are aligned along the line axis and wherein the rotating means further comprises a tensioning means for storing energy, said stored energy biasing the first section to turn relative to the second section along the line axis.

2. The invention of claim 1 wherein when the first section is rotated relative to the second section when a load is put on the tensioning means.

3. The invention of claim 2 wherein the tensioning means further comprises a spring having a first and second end and wherein the first end is attached to the first section and the second end is attach to the second section.

4. The invention of the preceding claim 3 further comprises a trigger means for fixing the position of the first section relative to the second section when the first section is rotated relative to the second section and wherein tension on the line releases the energy stored in the tensioning means.

5. The invention of claim 1 wherein tension to the lure to release energy from the rotating means comprises tension between the line and the lure.

6. The invention of claim 5 wherein the trigger means is on the first section and wherein the first section is heavier than the second section so that the second section does not have sufficient momentum to trigger the release of the rotating means.

7. The lure of claim 6 wherein the trigger means further comprises a lock end on the first section and key end on the second section and wherein the key end locks the lock end in place when the key is inserted and wherein the key is insertable when the first section is rotated relative to the second section to tension the spring.

8. The lure of claim 7 wherein the key is removed from the lock when tension is placed on the line.

9. A fishing lure attached to a line having an axis, said lure for receiving hooks comprising:
   1. a first section;
   2. a second section;
   3. a rotating means attached between the first section and second section for receiving and storing energy before the lure is cast and releasing the energy to rotate the first section relative to the second section upon the application of tension to the line and wherein the rotating means further comprises a tensioning means for storing energy biasing the first section to turn relative to the second section along the line axis and wherein when the first section is rotated relative to the second section when a load is put on the tensioning means and wherein the tensioning means further comprises a spring having a first and second end and wherein the first end is attached to the first section and the second end is attached to the second section and further comprising a trigger means for fixing the position of the first section relative to the second section when the first section is rotated relative to the second section and wherein tension on the line releases the energy stored in the tensioning means and wherein there is an alignment means to indicate to the user when the first section is aligned with the second section to power the rotating means.

10. A fishing lure, comprising:
    a) a body having a longitudinal axis;
    b) said body including a first section;
    c) a second section rotationally joined to said first section about said longitudinal axis and, wherein at least one hook receiving means for holding at least one hook is disposed on said first section of said body and wherein at least one hook is disposed on said second section of said body,
    d) a rotating means attached between the first section and second section for receiving and storing energy before the lure is cast and releasing the energy to rotate the first section relative to the second section upon the application of tension to the line.

11. A fishing lure as defined in claim 10, wherein:
    a) a groove is defined in said first section of said body for guiding rotational movement of said second section of said body relative to said first section.

12. A fishing lure as defined in claim 11, wherein:
    a) said body defines a longitudinal axis; and
    b) said groove extends transversely relative to said longitudinal axis; and wherein said groove extends substantially perpendicularly to said longitudinal axis.

13. A fishing lure as defined in claim 10, wherein:
    a) the rotating means comprises a spring disposed on said body, and said spring, rotationally around said longitudinal axis, biases the position of said second section relative to said first section.

14. A fishing lure as defined in claim 13, wherein:
    a) an engaging means is disposed adjacent said first and second body sections for maintaining against tension in the spring the position of the first section to the second section.

15. A fishing lure as defined in claim 14, wherein:
    a) a disengaging means for disengaging said engaging means.

16. A fishing lure as defined in claim 10 wherein said body defines a longitudinal axis; and further comprising:
    a) a cavity defined in said first section;
    b) an extension disposed on said second body section and configured for being received in said cavity;
    c) a female groove defined in said second body section around said longitudinal axis; and d) a protrusion disposed on said first body section, said protrusion being configured for engaging said female groove and for being guided thereby when said second body section moves relative to said first body section.

17. A fishing lure as defined in claim 16, wherein:
a) said female groove has a first end and a second end extends transversely to said longitudinal axis
b) the device further comprises a spring for biasing the protrusion to the second end of the groove.

18. A fishing lure as defined in claim 16, wherein:
a) said female groove extends transversely to said longitudinal axis and substantially perpendicularly relative to said longitudinal axis.

19. A fishing lure as defined in claim 18, wherein:
a) a spring is provided for keeping said second body section normally engaged with said first body section.

20. A fishing lure as defined in claim 19, wherein:
a) said spring is disposed between said first body section and said second body section.

21. A fishing lure as in claim 20, wherein:
a) an attachment means is provided on at least one of said first and second body sections, said attachment being configured for attaching a fishing line thereto.

22. A fishing lure as in claim 21, wherein:
a) said body defines a longitudinal axis;
b) said second body section is moveable relative to said first body section substantially along said longitudinal axis;
c) a spring is provided for keeping said second body section normally engaged with said first body section; and
d) said attachment means is disposed so that when, in use, and a line is attached to said attachment, and a fish pulls one of said first and second body sections relative to the other one of said first and second body sections, a force associated with the pulling by the fish overcomes the engaging spring force of said spring disposed between said first and second body sections for maintaining said first and second body sections normally engaged.

* * * * *